(12) United States Patent
Akagane

(10) Patent No.: US 7,761,002 B2
(45) Date of Patent: Jul. 20, 2010

(54) IMAGE CAPTURE APPARATUS AND IMAGE CAPTURE METHOD

(75) Inventor: Tsunetaka Akagane, Hachioji (JP)

(73) Assignees: Olympus Imaging Corp., Tokyo (JP); Sensormatic Electronics Corporation, Boca Raton, FL (US)

( * ) Notice: Subject to any disclaimer, the term of this patent is extended or adjusted under 35 U.S.C. 154(b) by 397 days.

(21) Appl. No.: 11/493,409

(22) Filed: Jul. 25, 2006

(65) Prior Publication Data

US 2007/0025721 A1  Feb. 1, 2007

(30) Foreign Application Priority Data

Aug. 1, 2005  (JP)  ............... 2005-222730

(51) Int. Cl.
*G03B 7/00* (2006.01)
(52) U.S. Cl. ...................................... 396/213; 396/216
(58) Field of Classification Search ................ 396/213, 396/459, 471, 216, 322; 348/56, 740
See application file for complete search history.

(56) References Cited

U.S. PATENT DOCUMENTS

| | | | | |
|---|---|---|---|---|
| 4,007,469 | A * | 2/1977 | Land et al. ................... | 396/169 |
| 5,467,226 | A * | 11/1995 | Watanabe ................... | 359/693 |
| 6,559,888 | B1 * | 5/2003 | Doron ..................... | 348/240.1 |
| 2002/0093582 | A1 * | 7/2002 | Aoki et al. ............. | 348/333.02 |
| 2003/0020958 | A1 * | 1/2003 | Bean et al. ................... | 358/302 |
| 2003/0052989 | A1 * | 3/2003 | Bean et al. ................... | 348/362 |
| 2004/0174430 | A1 * | 9/2004 | Sawahara et al. ........ | 348/14.02 |
| 2005/0094000 | A1 * | 5/2005 | Son et al. ............... | 348/231.99 |
| 2005/0253868 | A1 * | 11/2005 | Ageishi et al. .............. | 345/629 |
| 2005/0265714 | A1 * | 12/2005 | Rosdahl et al. ............. | 396/457 |
| 2006/0079302 | A1 * | 4/2006 | Kota et al. ............... | 455/575.3 |
| 2007/0133976 | A1 * | 6/2007 | Gutierrez et al. ............ | 396/248 |
| 2007/0242940 | A1 * | 10/2007 | Yumiki et al. ................. | 396/79 |

FOREIGN PATENT DOCUMENTS

| | | |
|---|---|---|
| JP | 2004-053722 | 2/2004 |
| JP | 2004-135271 | 4/2004 |

OTHER PUBLICATIONS

Chinese Office Action to Chinese Patent Application No. 2006101083238, mailed Dec. 7, 2007 (4 pgs.) with translation (2 pgs.).

* cited by examiner

*Primary Examiner*—Christopher E Mahoney
*Assistant Examiner*—Warren K Fenwick
(74) *Attorney, Agent, or Firm*—Straub & Pokotylo; John C. Pokotylo

(57) ABSTRACT

In an image capture apparatus which captures an image, with respect to one or a plurality of types of parameters to be set at a photo opportunity, a desired set value of the parameter is registered beforehand, and it is possible to easily change to a setting for the photo opportunity at the photo opportunity. Therefore, a user can easily change to a desired set value at the photo opportunity.

12 Claims, 8 Drawing Sheets

| | |
|---|---|
| P/A/S/M/S-Prg | NOISE REDUCTION |
| APERTURE STOP VALUE | DIGITAL ZOOM |
| SHUTTER SPEED | FULLTIME AF |
| EXPOSURE CORRECTION | AF SYSTEM |
| xD·SM/CF | STILL RECORDING |
| LCD | PANORAMA |
| ZOOM POSITION | SYNTHESIS TWO SHOT |
| FLASH | FUNCTION PHOTOGRAPHING |
| FLASH CORRECTION | HISTOGRAM DISPLAY |
| SPOT | IMAGE QUALITY MODE |
| SELF/REMOTE CONTROL | WHITE BALANCE |
| AF/MACRO/MF | WB CORRECTION |
| DRIVE | SCENE PRESET |
| ISO SENSITIVITY | SHARPNESS |
| FLASH SELECTION | CONTRAST |
| SLOW SYNCHRO | CHROMA |

Fig. 7

IMAGE CAPTURE APPARATUS AND IMAGE CAPTURE METHOD

CROSS-REFERENCE TO RELATED APPLICATION

This application is based upon and claims the benefit of priority from prior Japanese Patent Application No. 2005-222730, filed on Aug. 1, 2005, the entire contents of which are incorporated herein by reference.

BACKGROUND OF THE INVENTION

1. Field of the Invention

The present invention relates to an image capture apparatus and an image capture method which is capable of quickly switching to a desired set value at a photo opportunity.

2. Description of the Related Art

In a case where a picture is taken with a digital camera, it is general to take the picture after selecting various set values or with beforehand set values. When these values are appropriately set, it is possible to capture an image in which the performance of a camera is fully utilized.

For example, the captured image is generally stored in a predetermined image format. When the image is stored in a highly compressed image format, the number of the images which can be stored in the same memory increases, but an image quality is not very satisfactory. On the other hand, if the image is stored in a non-compressed or low-compressed image format, the number of the images which can be stored in the same memory is reduced, but the image quality becomes satisfactory, and the image can be edited later or printed largely.

As set options which can be selected in the digital camera, there are not only zoom and focus settings but also a shutter speed, exposure correction, the presence of a flash, continuous/single shoot setting and ISO. In addition, there are various mode settings, a stored image format and the like.

In Japanese Patent Application Laid-Open No. 2004-135271, a technology is described in which a button is disposed to display menu options for frequent use, and a trouble in changing a setting of a specific function can be saved.

BRIEF SUMMARY OF THE INVENTION

In an image capture apparatus of the present invention, with respect to one or a plurality of parameters to be set at a photo opportunity, a desired set value of the parameter is registered beforehand, so that a setting can easily be changed to that for the photo opportunity when the photo opportunity comes. Therefore, a user can easily change the current set value of the image capture apparatus to the desired set value at the photo opportunity.

There will be described one example of a constitution of an image capture apparatus of the present invention. The apparatus includes: an image capture parameter setting section which sets values of a plurality of image capture parameters for use during image capture; a parameter selecting section which selects at least one image capture parameter from the plurality of image capture parameters set by the image capture parameter setting section; a selected parameter storage section which sets and stores the value of the image capture parameter selected by the parameter selecting section; a first shutter section which designates a timing to perform first image capture; and a second shutter section which designates a timing to perform second image capture, wherein the first shutter section starts the image capture by use of the values of the image capture parameters set by the image capture parameter setting section, and the second shutter section starts the image capture by using the value of the parameter stored in the selected parameter storage section as the image capture parameter selected by the image capture parameter selecting section, and using the values of the image capture parameters set by the parameter setting section as the image capture parameter other than the selected parameter.

The present invention can also be understood as an image capture method.

According to the present invention, it is possible to easily and quickly switch to the desired set value at the photo opportunity.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 7 is a diagram showing examples of selectable parameters;

DETAILED DESCRIPTION OF THE PREFERRED EMBODIMENTS

Figure 1:
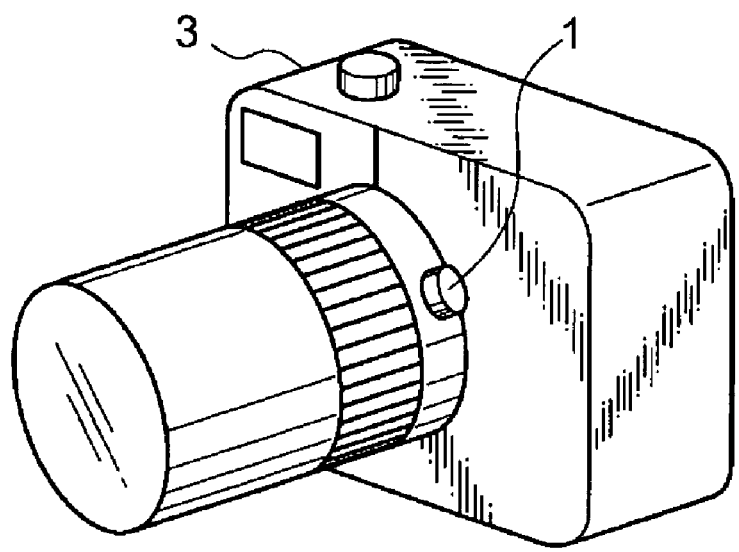
FIG. 1 is a perspective view showing an image capture apparatus in a first embodiment.

A preferred embodiment of the invention is described below with reference to the accompanying drawings.

There will be described a method of changing a parameter set value at a photo opportunity of an image capture apparatus in the present invention.

In the image capture apparatus of the present invention, with one or a plurality of parameters to be set at the photo opportunity, desired set values of the parameter are registered beforehand (setting for the photo opportunity). Moreover, the apparatus is capable of easily changing to a setting for the photo opportunity at the photo opportunity (photo opportunity function). Therefore, a user can easily change to the desired set value at the photo opportunity.

For example, it is assumed that image is usually captured on conditions of highly compressed JPEG standard having a small file size with a single shoot in order to utilize a memory effectively. However, at the photo opportunity, a satisfactory image having a high quality cannot be captured with such a setting. To solve the problem, the setting is switched to the setting for the photo opportunity by a one-touch operation, and the image is captured, for example, in a raw image format with continuous shoots. Accordingly, at a time other than the photo opportunity, a size of the image is small, and at the photo opportunity, a high image quality is obtained. Both of the settings can easily be switched with each other. Therefore, the effective utilization of the memory, enhancement of the image quality and simplification of resetting are simultaneously realized.

As to a switch setting at the photo opportunity, the user selectively changes an only image capture setting option to be set again for the photo opportunity. For example, when a storage form is set to be changed to a raw form for the photo opportunity, the other setting options are not changed, and the only storage form is changed to the raw form.

Moreover, it can be configured such that by combining a plurality of photo opportunity functions, the settings of each of the photo opportunity function can be utilized at the same time. For example, as a setting other than the above setting, it is assumed that the image is set to be captured with the continuous shoot at the photo opportunity. In a case where this setting and the above setting are associated with separate operation buttons, when two buttons are simultaneously pressed, both of the settings can be changed from the current settings to those for the photo opportunity.

Furthermore, it can be configured such that in a setting parameter such as a white balance, in a case where an auto form is to be changed to a manual form at the photo opportunity, the current auto value in the auto form is taken over as an initial state to the manual form. Accordingly, the user can take a picture without any sense of incongruity, when the setting is changed at the photo opportunity.

Next, there will be described one embodiment of the image capture apparatus of the present invention.

The image capture apparatus of the present invention includes a new operation member for the photo opportunity as well as ordinary operating section having a member for image capturing. This new operation member for photo opportunity can be assigned to a button of the operating section or the like.

FIG. 1 is a perspective view showing the image capture apparatus in the present embodiment.

On a zoom ring of the image capture apparatus, a photo opportunity button (second operation member) 1 is disposed. While this photo opportunity button is pressed, the set value of the image capture apparatus continues to be switched to that for the photo opportunity. While the apparatus is brought into such a mode as to use the set value for the photo opportunity (hereinafter referred to as the photo opportunity mode), this application of the mode is displayed in a finder or a preview screen.

It is to be noted that this button may be disposed on a camera main body portion or another portion. Another camera operation button may be assigned to this function, or another detachable switch may be provided for this function.

Figure 2:
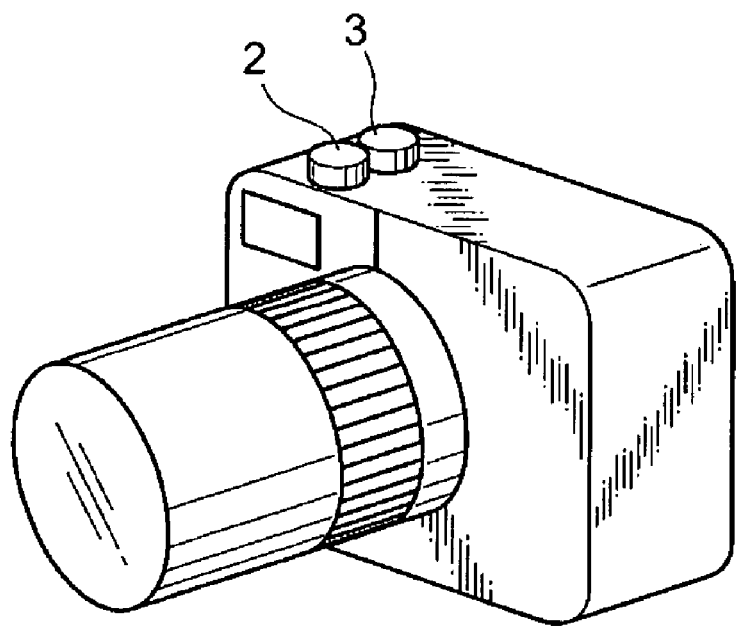
FIG. 2 is a perspective view showing an image capture apparatus in a variation of the first embodiment.

FIG. 2 is a perspective view showing an image capture apparatus in a variation of the present embodiment.

In this variation, a shutter button also having a function of the photo opportunity button is separately disposed with an ordinary shutter button. In FIG. 2, two shutter buttons are prepared, one of the buttons is a shutter button (first operation member) 3 for usual picture taking, and the other button is a shutter button (another second operation member) 2 for the photo opportunity. When the shutter button 2 at the photo opportunity is pressed, the switching to the setting for the photo opportunity and a release operation are executed. In this variation, a user can select one of the shutter buttons in accordance with a picture taking situation to prepare for the photo opportunity.

Figure 3:
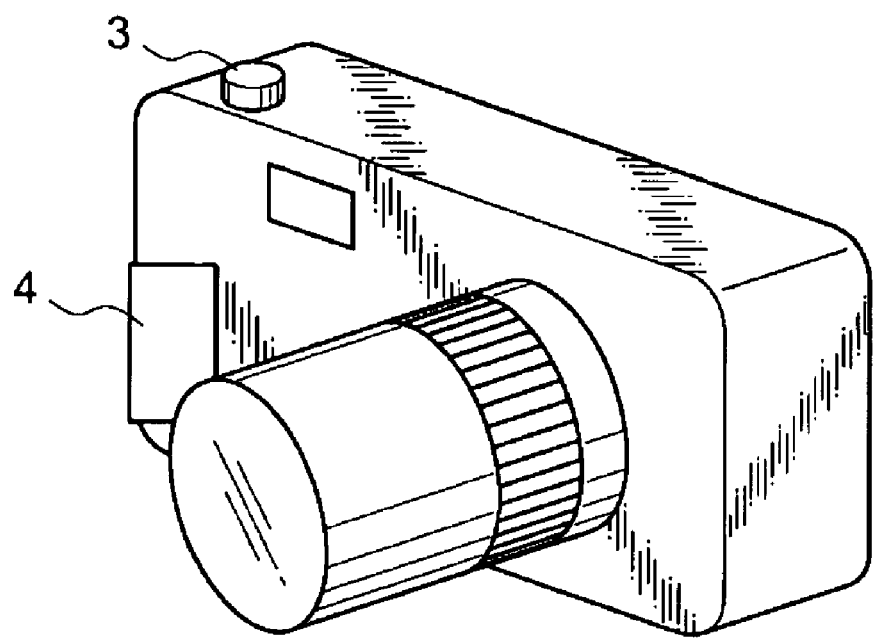
FIG. 3 is a perspective view showing an image capture apparatus in another variation of the first embodiment.

FIG. 3 is a perspective view showing an image capture apparatus in another variation of the present embodiment.

In this variation, the apparatus includes a release button portion, a grip portion, and a pressure sensor (another second operation member) 4 on a lens including a zoom ring. When this pressure sensor 4 is strongly gripped at the photo opportunity, the setting can be switched to that for the photo opportunity.

Figure 4:
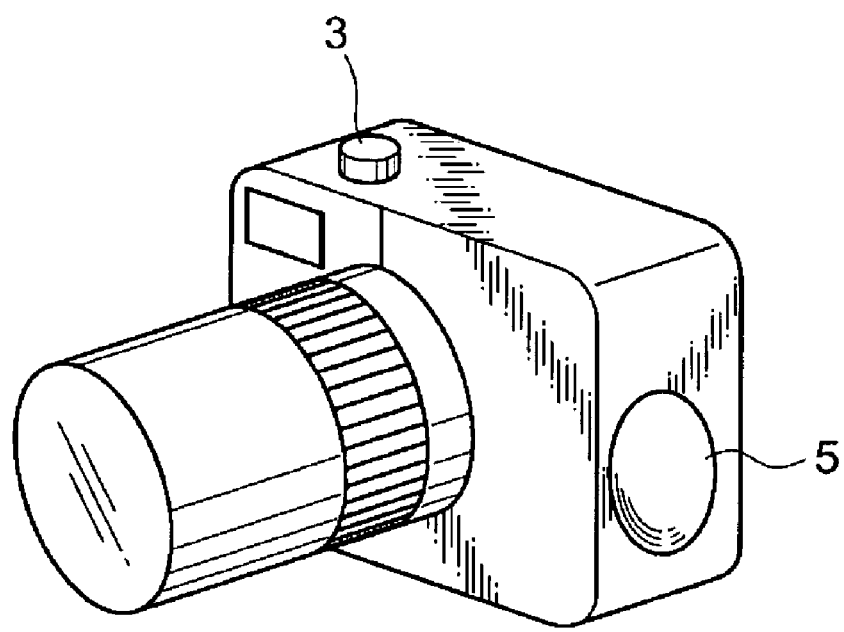
FIG. 4 is a perspective view showing an image capture apparatus in still another variation of the first embodiment.

FIG. 4 is a perspective view showing an image capture apparatus in still another variation of the present embodiment.

In this variation, as a voice recognition device 5, a microphone or the like is disposed. The voice recognition device 5 recognizes voice given by a user, and the switching for the photo opportunity can be performed responding to it.

Figure 5:
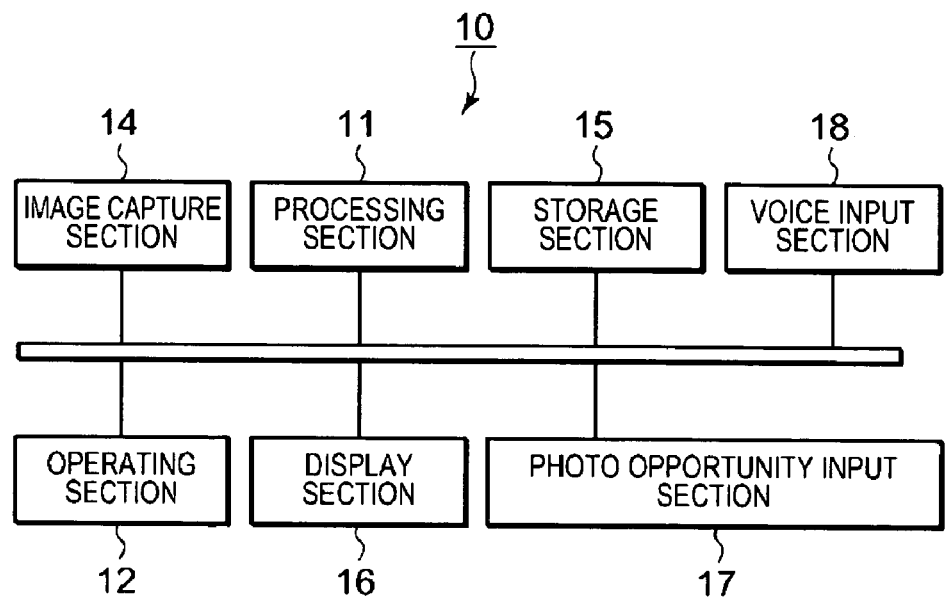
FIG. 5 is a block diagram showing a constitution of the image capture apparatus.

FIG. 5 is a block diagram showing a constitution of the image capture apparatus.

An image capture apparatus 10 is provided with a processing section 11, an operating section 12, an image capture section 14, a storage section 15, a display section 16, a photo opportunity input section 17 and a voice input section 18.

The processing section 11 generally controls an operation of the image capture apparatus 10. The operating section 12 is an input device for receiving an operation instruction input from the user. The image capture section 14 captures an image of a subject to generate image data of the subject. The storage section 15 stores the set value of the parameter and the like. The display section 16 is a liquid crystal display which displays a menu and the like. The photo opportunity input section 17 is an operation member or device for switching to the set value at the photo opportunity, and corresponds to the above photo opportunity button 1 or the like. The voice input section 18 is a voice receiving unit for receiving the user's voice.

Subsequently, there will be described an operation of the image capture apparatus 10 in the present embodiment.

Figure 6:
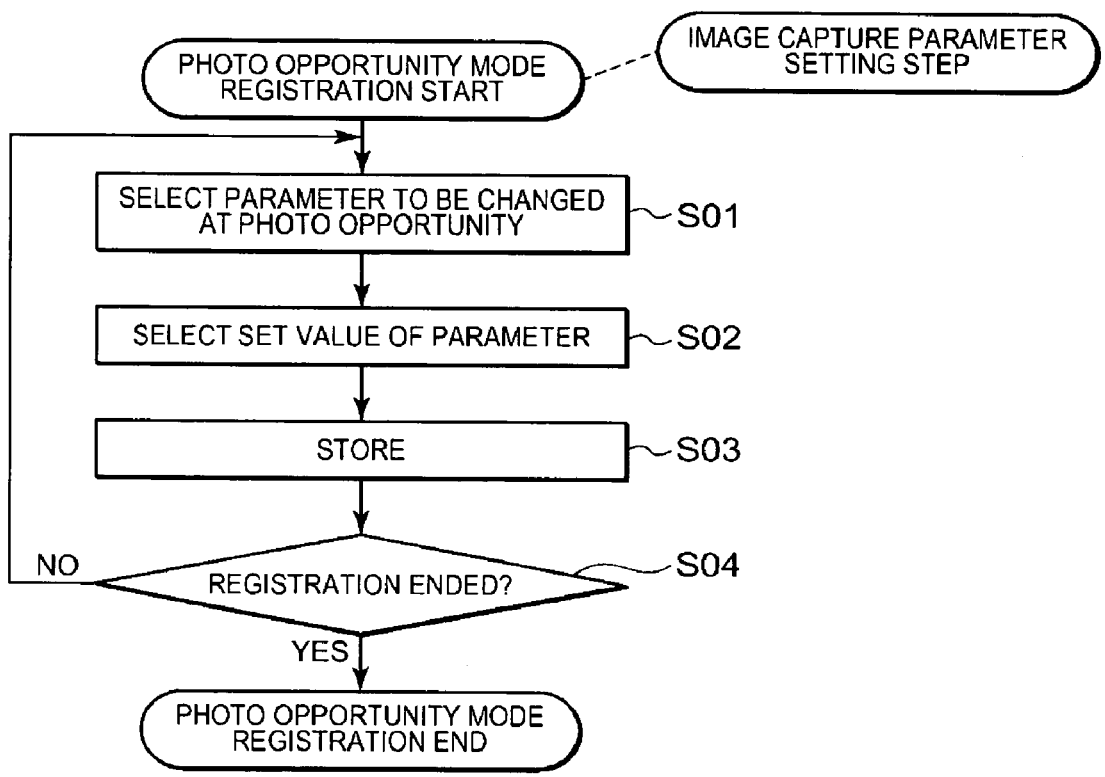
FIG. 6 is a flow chart showing a schematic procedure to register a set value of a photo opportunity mode.

FIG. 6 is a flow chart showing a schematic procedure to register the set value of the photo opportunity mode.

Prior to the picture taking, the user operates the operating section 12 to set a plurality of image capture parameters for use in the usual picture taking (image capture parameter setting function, image capture parameter setting step).

In step S01, the user selects the parameter to be changed at the photo opportunity (parameter selecting function, parameter selecting step). This selection is executed by setting the parameter to be changed from the menu displayed in the display section 16 of the image capture apparatus 10 by use of an arrow pad or the like of the operating section 12.

FIG. 7 is a diagram showing examples of selectable parameters.

In step S02, the selected value of the selected parameter is selected. For example, with respect to parameter "ISO sensitivity", as the set values, "auto", "64", "100", "200" and "400" can be selected. Furthermore, in step S03, when the user performs a confirming operation with the operating section 12, the selected parameter and the set value of the parameter are stored in the storage section 15 (selected parameter storage function, selected parameter storage step).

In step S04, it is judged whether or not the selection of the parameter, the selection of the value of the parameter and the registration have been ended. If the answer to this step is no, that is, still another parameter is selected, the flow returns to the step S01, and the above operation is continued. In a case where the answer to the step S04 is yes, that is, the setting is ended, when the user does an operation for ending the registration of the photo opportunity mode, the values of the plurality of parameters input up to that time are registered as one setting of the photo opportunity mode.

It is to be noted that the registration for the photo opportunity mode can be performed in several times, and a desired parameter can be registered in each time.

Figure 8:
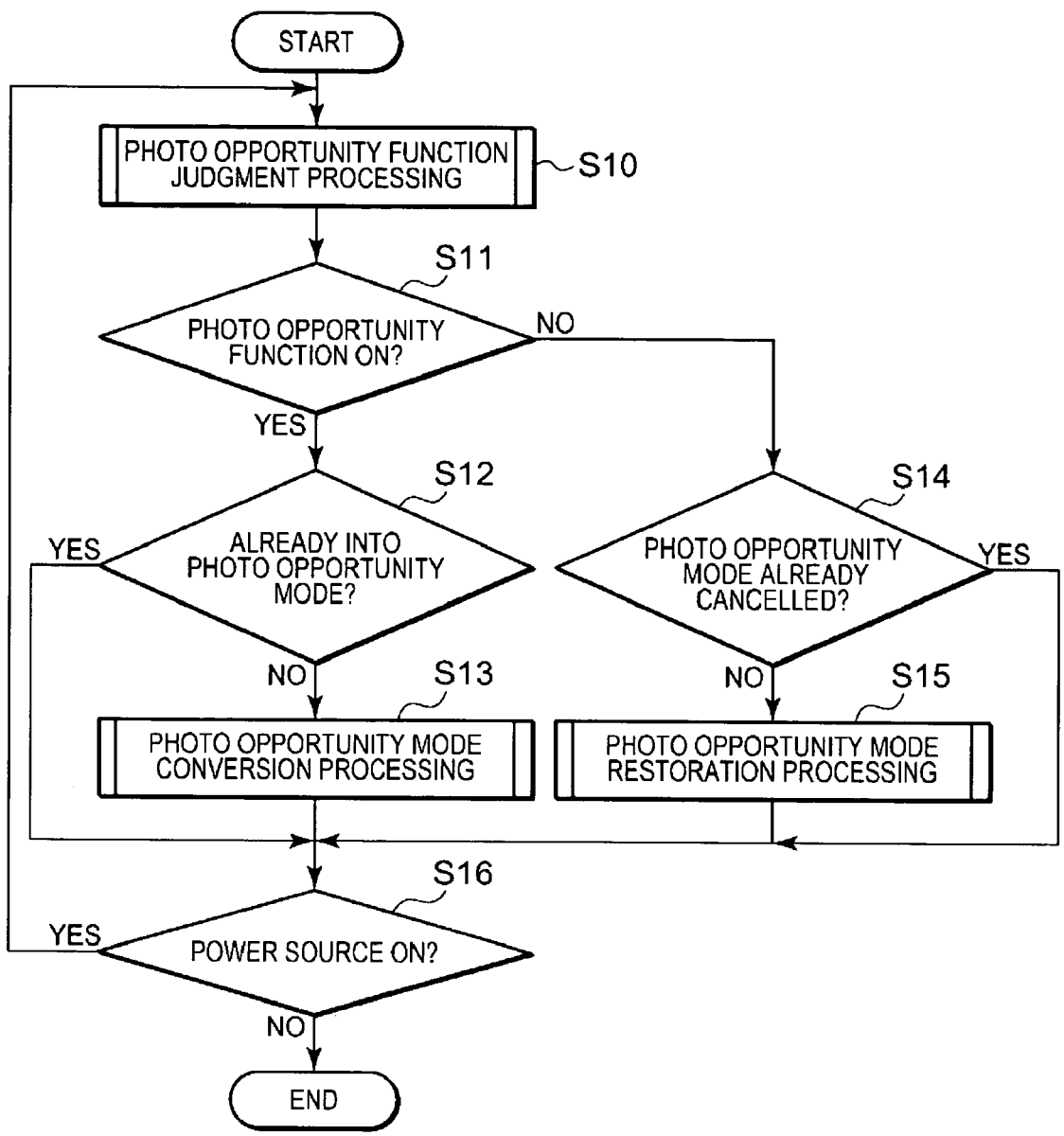
FIG. 8 is a schematic flow chart showing an operation to handle a set value at a photo opportunity.

FIG. 8 is a schematic flow chart showing an operation to handle a set value at the photo opportunity. Processing of FIG. 8 is initiated by main processing of the image capture apparatus 10, and the processing on the setting for the photo opportunity is executed. It is to be noted that this flow chart shows an operation of the image capture apparatus 10 provided with the characteristics shown in FIGS. 1, 3 and 4. An embodiment shown in FIG. 2 will be described later.

In step S10 of FIG. 8, photo opportunity function judgment processing (FIG. 9) is executed.

Figure 9:
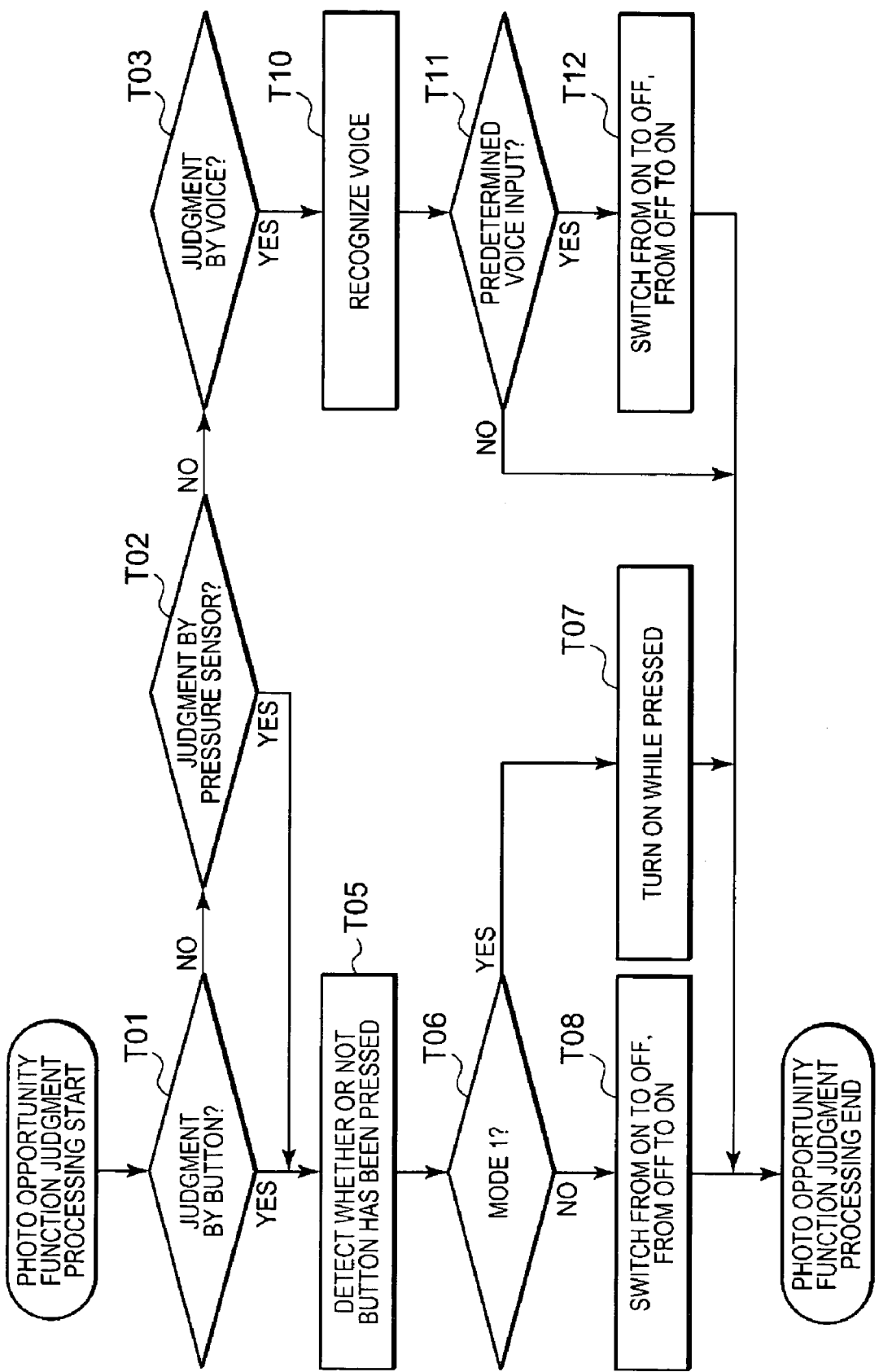
FIG. 9 is a flow chart showing a procedure of photo opportunity function judgment processing.

In steps T01, T02 of FIG. 9, it is judged whether or not the photo opportunity button 1 (FIG. 1) has been operated or whether or not the pressure sensor 4 (FIG. 3) has been operated.

In step T05, when the photo opportunity input section 17 detects that the photo opportunity button 1 or the pressure sensor 4 has been pressed, it is checked in step T06 whether or not the photo opportunity mode of the image capture apparatus 10 is brought into "mode 1".

Here, the "mode 1" is a mode in which the photo opportunity function is turned on while the photo opportunity button 1 or the pressure sensor 4 is pressed. That is, when the finger is released from the photo opportunity button 1 or the pressure sensor 4, the photo opportunity function does not work from the releasing time.

On the other hand, "mode 2" is a mode to switch the photo opportunity function from ON to OFF or from OFF to ON, every time the photo opportunity button 1 or the pressure sensor 4 is pressed. Therefore, unlike the "mode 1", the photo opportunity button 1 or the pressure sensor 4 does not have to continue to be pressed.

It is to be noted that the photo opportunity function is controlled by a flag indicating whether the set value at the photo opportunity is valid or invalid.

In a case where the answer to the step T06 is yes, that is, in the "mode 1", in step T07, while the photo opportunity button 1 or the pressure sensor 4 is pressed, the photo opportunity function is turned on. In a case where the answer to the step T06 is no, that is, in the "mode 2", in step T08, the photo opportunity function is switched to ON or OFF.

In addition, in a case where the answer to step T02 is no, the flow advances to step T03 to check whether or not an input of voice has been made.

Here, the voice to be input may be sound or a word. For example, a word such as "chance" or "up" may be input.

When in step T10, the voice input section 18 recognizes by voice recognition that the voice has been input, it is checked in step T11 whether or not the input voice has a predetermined voice pattern.

Moreover, in a case where the answer to the step T11 is yes, that is, the voice has the predetermined voice pattern, in step T12, the photo opportunity function is switched to ON or OFF. In a case where the answer to the step T11 is no, that is, the voice does not have any predetermined voice pattern, the switching of the photo opportunity function is not executed.

It is to be noted that in the switching of the photo opportunity function by the voice, the function of the "mode 2" is disposed, but the function of the "mode 1" is not disposed.

Returning to FIG. 8, it is checked in step S11 whether or not the photo opportunity function turns on. In a case where the answer to the step S11 is yes, that is, the photo opportunity function is on, it is checked in step S12 whether or not the image capture apparatus 10 has already been brought into the photo opportunity mode. Here, when it is mentioned that the apparatus is in the photo opportunity mode, it is indicated that the set value is changed to that for the photo opportunity.

Figure 10:
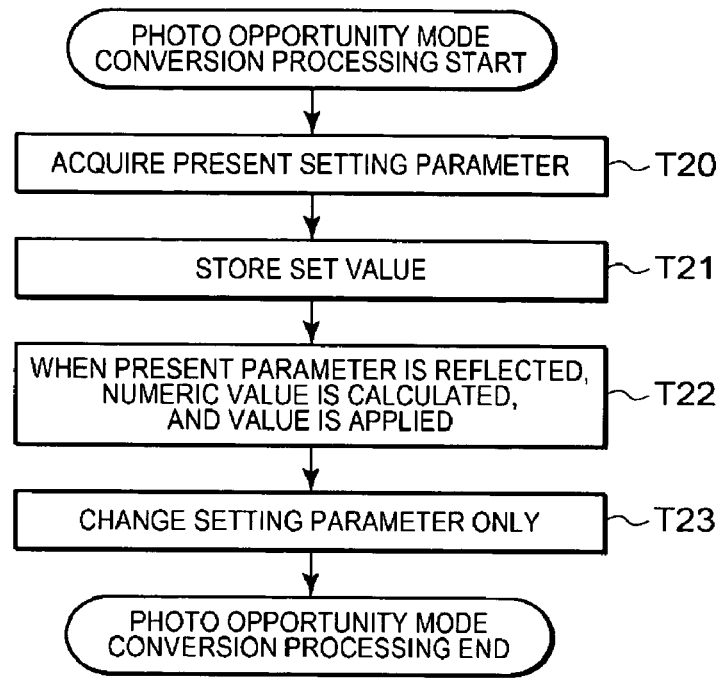
FIG. 10 is a flow chart showing a procedure of photo opportunity mode change processing.

In a case where the answer to the step S12 is yes, that is, the image capture apparatus 10 is in the photo opportunity mode, the flow advances to the next step, and any processing is not especially executed. In a case where the answer to the step S12 is no, that is, the image capture apparatus 10 is in photo opportunity mode, photo opportunity mode conversion processing (FIG. 10) shown in step S13 is executed.

Here, the photo opportunity mode conversion processing will be described. In step T20 of FIG. 10, the value of the parameter set in the image capture apparatus 10 at present is acquired, and in step T21, the value of the parameter is stored in the storage section 15. Subsequently, in step T22, for a parameter where the present parameter value is applied, the value of the parameter is calculated and applied.

For example, in a case where "shutter speed" is changed from "auto" to "manual", the current "shutter speed" is calculated in the auto mode based on an exposure value, and a calculation result is set as the initial "shutter speed" in a manual mode.

Moreover, in step T23, the value of the parameter only registered in the photo opportunity mode is changed to the set value.

Returning to FIG. 8, in a case where the answer to the step S11 is no, that is, the photo opportunity function is off, it is checked in step S14 whether or not the photo opportunity mode of the image capture apparatus 10 has already been cancelled. Here, when it is mentioned that the photo opportunity mode is cancelled, it means that the parameter is restored to the original parameter.

Figure 11:
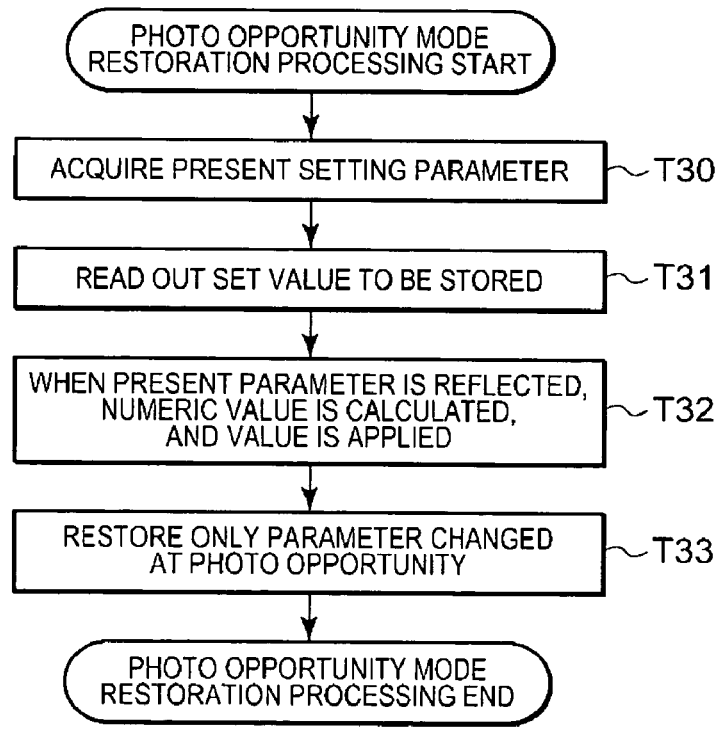
FIG. 11 is a flow chart showing a procedure of photo opportunity mode restoration processing.

In a case where the answer to the step S14 is yes, that is, the image capture apparatus 10 cancels the photo opportunity mode, the flow advances to the next step, and any processing is not especially executed. In a case where the answer to the step S14 is no, that is, the image capture apparatus 10 does not cancel the photo opportunity mode, photo opportunity mode restoration processing (FIG. 11) shown in step S15 is executed.

Here, the photo opportunity mode restoration processing will be described. In step T30 of FIG. 11, the value of the parameter at the photo opportunity is acquired which is set in the image capture apparatus 10 at present. Moreover, in step T31, a value of the original parameter is read out which has been stored in the storage section 15. Subsequently, in step T32, for a parameter to which the present parameter value is reflected, the value of the parameter is calculated, and applied.

Moreover, in step T33, the value applied only for the photo opportunity is returned to the original value.

Returning to FIG. 8, in step S16, the above processing on the set value at the photo opportunity is repeatedly executed until a power source is turned off. In a case where the answer to the step S16 is no, that is, the power source is turned off, the processing ends.

Figure 12:
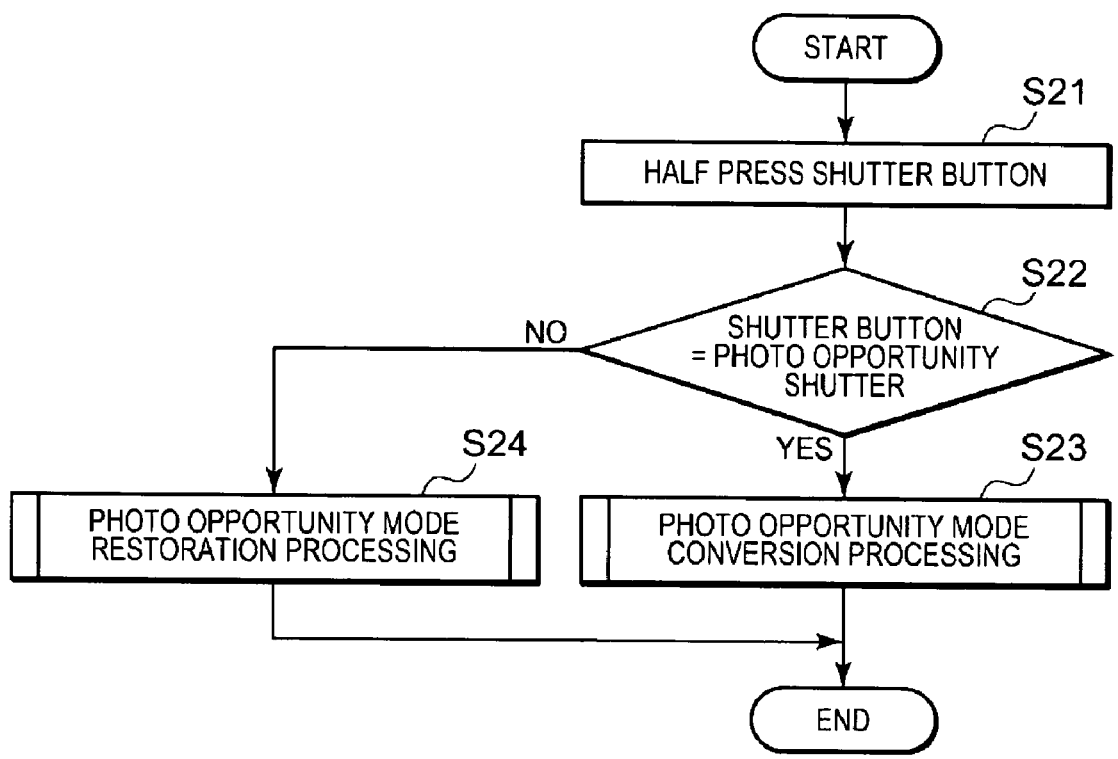
FIG. 12 is a schematic flow chart showing another operation to handle a set value at the photo opportunity.

FIG. 12 is a schematic flow chart showing another operation to handle the set value at the photo opportunity. Processing of FIG. 12 is initiated with main processing of the image capture apparatus 10, and the processing on the set value at the photo opportunity is executed. It is to be noted that this flow chart shows an operation of the image capture apparatus 10 in the embodiment shown in FIG. 2. That is, there is shown the flow chart concerting the image capture apparatus 10 separately provided with a shutter for the photo opportunity.

When in step S21, it is detected that either of the shutter buttons 2 and 3 is half pressed, it is checked in step S22 whether or not the shutter 2 for the photo opportunity has been operated.

In a case where the answer to the step S22 is yes, that is, the shutter 2 for the photo opportunity is operated, photo opportunity mode conversion processing (FIG. 10) shown in step S23 is executed. This photo opportunity mode conversion processing is processing to switch to the set value for the photo opportunity. Since the processing has already been described, redundant description is omitted.

In a case where the answer to the step S22 is no, that is, the shutter 2 for the photo opportunity is not operated, photo opportunity mode restoration processing (FIG. 11) shown in step S24 is executed. This photo opportunity mode restoration processing is processing to return to an original parameter set value. Since the processing has already been described, redundant description is omitted.

In this manner, when the shutter 2 for the photo opportunity is operated in the image capture apparatus 10 of the embodiment shown in FIG. 2, the set value at the photo opportunity is applied. When the usual shutter 3 is operated, the original set value is applied.

Moreover, other than preparing for the photo opportunity, this invention can be applied for a case where the user wants to easily capture an image having no importance without using much memory capacity by, for example, adopting lower grade of image quality and capturing method than ordinal image capturing.

It is to be noted that since the operating section 12 shown in FIG. 5 has an image capture parameter setting function and a parameter selecting function, the section may be referred to as an image capture parameter setting section and a parameter selecting section. Since the operating section 12 and the storage section 15 have a selected parameter storage function, the sections may be referred to as a selected parameter storage section. The shutter button 3 for the usual picture taking, which is the first operation member, may be referred to as a first shutter section which designates a timing to perform first image capture. The shutter button 2 at the photo opportunity, a combination of the shutter button 2 for the usual picture taking and the photo opportunity button 1, a combination of the shutter button 2 for the usual picture taking and the pressure sensor 4, and a combination of the shutter button 2 for the usual picture taking and the voice recognition device 5 may be referred to as a second shutter section to designate a timing to perform second image capture.

As described above, according to the embodiment, a button is arranged on a lens or a main body of the image capture apparatus 10, and the operation of the button or other member can alter a setting such as an image format or image size for storage. The operation can further alter other settings such as selection of single shot and continuous shots.

Moreover, instead of the ordinary buttons, a plurality of shutter buttons may be prepared to change the image capture mode with the operation of the shutter buttons.

Therefore, since it is possible to quickly and readily change to optimum image capture setting, it is possible to cope with the photo opportunity in an image capture system without changing a photographer's posture.

It is to be noted that the present invention can be carried out in various variations of the embodiments.

For example, a plurality of sets of set values for the photo opportunity can be prepared beforehand, and they may appropriately be selected. Further, it can be possible that combinations of the plurality of sets of set values are allowed for use.

The present invention includes various characteristics which have not been seen in conventional arts.

Conventional arts propose an art of setting a short-cut for reducing operations when a user sets the optimum photo conditions for one scene. On the other hand, the present invention has aims to instant photo-shoots without losing the photo opportunity under preferable conditions.

Therefore, to meet the purpose, in the present invention, various functions are proposed.

Main examples of the functions are as follows.

(1) An operation in which the setting is effective at an only time when a button is pressed, and returns to an original setting by releasing the button.

(2) An operation to change the only settings for selection. In the conventional arts, all settings are changed.

(3) A constitution in which a button are adopted so that the image capture can immediately be performed. In a conventional method in which a mode dial is used, a user has to take the eyes off a finder, and accordingly change a posture to operate the camera.

It is to be noted that the functions described above in the embodiments may be constituted using hardware, or realized by allowing a computer to read a program in which the functions are described by use of software. The functions may be constituted by appropriately selecting either of the software and the hardware.

Furthermore, the functions may be realized by making the computer to read a program stored in a recording medium (not shown). Here, in the recording medium of the present embodiment, any recording form may be used as long as the recording medium can record the program, and can be read by the computer.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An image capture apparatus which captures an image, comprising:
    a display section configured to display parameters and values of the parameters used in setting of a photo opportunity mode which enables capturing of images that could not be captured in a usual picture taking mode;
    a setting section to set at least one set value of the photo opportunity mode selected by a user when the display section displays the display parameters and values of the parameters, wherein the setting section selects at least one parameter used at capturing an image and wherein the at least one set value of the selected at least one parameter is used as the at least one set value of the photo opportunity mode;
    a storage section to store the selected at least one parameter for capturing an image and the set value of each of the at least one parameter;
    a shutter member which designates a timing to perform image capture in the usual picture taking mode;
    a switching operation member which designates a switch from the usual picture taking mode to the photo opportunity mode with one operation of the user when the switching operation member is switched by the one operation of the user in the usual picture taking mode; and
    a mode switching section which switches from the usual picture taking mode to the photo opportunity mode in response to the one operation of the user of the switching operation member, wherein the mode switching section switches the function of the photo opportunity mode from one of (A) ON to OFF and (B) OFF to ON, every time the switching operation member is operated, and wherein the image capture is performed using the at least one set value stored in the storage section for the photo opportunity when the shutter member is operated in the photo opportunity mode.

2. The image capture apparatus according to claim 1 further comprising a display section displaying the application of the photo opportunity mode while the image capture apparatus is brought into the photo opportunity mode.

3. The image capture apparatus according to claim 1, wherein the switching operation member is disposed on a zoom ring.

4. The image capture apparatus according to claim 1, wherein
the switching operation member includes a pressure sensor arranged on a lens or on a main body of the image capture apparatus, and
the state of the image capture apparatus is switched between the usual picture taking mode and the photo opportunity mode only when a portion where the pressure sensor is arranged is gripped.

5. The image capture apparatus according to claim 1, wherein the switching operation member includes a voice input section and a voice recognition device.

6. An image capture apparatus which captures an image, comprising:
a display section configured to display parameters and values of the parameters used in setting of a photo opportunity mode which enables capturing of images that could not be captured in a usual picture taking mode;
a setting section to set at least one set value of a photo opportunity mode selected by a user when the display section displays the display parameters and values of the parameters, wherein the setting section selects at least one parameter used at capturing an image and wherein at least one set value of the selected at least one parameter is used as the at least one set value of the photo opportunity mode;
a storage section to store the selected at least one parameter for capturing an image and the set value of each of the at least one parameter;
a shutter member which designates a timing to perform image capture in the usual picture taking mode;
a switching operation member which designates a switch from the usual picture taking mode to the photo opportunity mode with one operation of the user when the switching operation member is switched by the one operation of the user in the usual picture taking mode;
a mode switching section which switches from the usual picture taking mode to the photo opportunity mode in response to the one operation of the user of the switching operation member, wherein the mode switching section switches from the usual picture taking mode to the photo opportunity mode only when the switching operation member is judged to have been operated, and wherein the image capture is performed using the at least one set value stored in the storage section for the photo opportunity when the shutter member is operated in the photo opportunity mode.

7. The image capture apparatus according to claim 6 further comprising a display section displaying the application of the photo opportunity mode while the image capture apparatus is brought into the photo opportunity mode.

8. The image capture apparatus according to claim 6, wherein the switching operation member is disposed on a zoom ring.

9. The image capture apparatus according to claim 6, wherein
the switching operation member includes a pressure sensor arranged on a lens or on a main body of the image capture apparatus, and
the state of the image capture apparatus is switched between the usual picture taking mode and the photo opportunity mode only when a portion where the pressure sensor is arranged is judged to have been gripped.

10. The image capture apparatus according to claim 6, wherein the switching operation member includes a voice input section and a voice recognition device.

11. An image capture method of an image capture apparatus which comprises a shutter member for designating a timing to perform an image capture, the image capture method comprising:
displaying parameters and values of the parameters used in setting of a photo opportunity mode which enables capturing of images that could not he captured in a usual picture taking mode;
setting at least one set value of the photo opportunity mode selected by a user when the parameters and values of the parameters are displayed, wherein the act of setting selects at least one parameter for capturing an image and a set value of the each of the selected at least one parameter is used as the at least one set value of the photo opportunity mode;
storing the selected parameters for capturing an image and the set value of each of the at least one parameter;
switching the function of the photo opportunity mode from one of (A) ON to OFF and (B) OFF to ON, every time a switching operation member for switching between the usual picture taking mode and the photo opportunity mode is operated in the usual picture taking mode; and
performing the image capture with using the at least one set value stored in a storage device for the photo opportunity when the shutter member is operated while the image capture apparatus is brought into the photo opportunity mode by operating the switching operation member.

12. An image capture method of an image capture apparatus which comprises a shutter member for designating a timing to perform the image capture, comprising:
displaying parameters and values of the parameters used in setting of a photo opportunity mode which enables capturing of images that could not be captured in a usual picture taking mode;
setting at least one set value of the photo opportunity mode selected by a user when the parameters and values of the parameters are displaying which selects at least one parameter used at capturing an image and the set value of each of the selected at least one parameter are used as the at least one set value of the photo opportunity mode;
storing the selected at least one parameter for capturing an image and the set value of the at least one parameter;
designating to switch from the usual picture taking mode to the photo opportunity mode when a switching operation member for switching between the usual picture taking mode and the photo opportunity mode is judged to have been operated in the usual picture taking mode; and
performing the image capture with using the at least one set value stored in a storage device for the photo opportunity when the shutter member is operated while the image capture apparatus is brought into the photo opportunity mode by operating the switching operation member.

* * * * *